US009441280B2

(12) United States Patent
Pease et al.

(10) Patent No.: US 9,441,280 B2
(45) Date of Patent: Sep. 13, 2016

(54) CHROMATOGRAPHIC SEPARATION OF SUGARS USING BLEND OF CATION EXCHANGE RESINS

(71) Applicants: Dow Global Technologies LLC, Midland, MI (US); Rohm and Haas Company, Philadelphia, PA (US)

(72) Inventors: Stephen Pease, Ambler, PA (US); Gongwei Pu, Shanghai (CN)

(73) Assignees: Dow Global Technologies LLC; Rohm and Haas Company

( * ) Notice: Subject to any disclaimer, the term of this patent is extended or adjusted under 35 U.S.C. 154(b) by 0 days.

(21) Appl. No.: 14/909,817

(22) PCT Filed: Aug. 15, 2014

(86) PCT No.: PCT/US2014/051166
§ 371 (c)(1),
(2) Date: Feb. 3, 2016

(87) PCT Pub. No.: WO2015/034643
PCT Pub. Date: Mar. 12, 2015

(65) Prior Publication Data
US 2016/0194727 A1    Jul. 7, 2016

Related U.S. Application Data

(60) Provisional application No. 61/874,117, filed on Sep. 5, 2013.

(51) Int. Cl.
*C13K 1/04*    (2006.01)
*C13K 11/00*   (2006.01)
*B01J 39/20*   (2006.01)
(Continued)

(52) U.S. Cl.
CPC ............... *C13K 1/04* (2013.01); *B01D 15/362* (2013.01); *B01J 39/20* (2013.01); *B01J 39/26* (2013.01); *C13K 11/00* (2013.01)

(58) Field of Classification Search
None
See application file for complete search history.

(56) References Cited

U.S. PATENT DOCUMENTS 2,500,149 A   3/1950   Boyer
2,631,127 A   3/1953   D'Alelio
(Continued)

FOREIGN PATENT DOCUMENTS

EP    361685     1/1994
GB    1323754    7/1973
(Continued)

OTHER PUBLICATIONS

Caruel, et al., "Carbohydrate Separation by Ligand-Exchange Liquid Chromatography", Journal of Chromatography, Elsevier Science Publishers B.V, NL, vol. 558, 1991, pp. 89-104.

*Primary Examiner* — Melvin C Mayes
*Assistant Examiner* — Stefanie Cohen

(57) ABSTRACT

A chromatographic method for separating a sugar from a sugar-containing liquid feed mixture by: contacting the liquid feed mixture with a stratum of cation exchange resin comprising a crosslinked copolymer matrix functionalized with sulfonic acid groups, and recovering a first product stream from the stratum that has a higher purity of the sugar than present in the liquid feed mixture. The method is characterized by the stratum of cation exchange resin including: i) at least 80 wt % of cation exchange resin including alkaline earth counter ions, and ii) at least 5 wt % of cation exchange resin including alkali earth counter ions.

8 Claims, 1 Drawing Sheet

(51) Int. Cl.
   *B01J 39/26*   (2006.01)
   *B01D 15/36*   (2006.01)

(56) References Cited

U.S. PATENT DOCUMENTS

| | | |
|---|---|---|
| 2,664,801 A | 1/1954 | Eisbein |
| 2,764,564 A | 9/1956 | McMaster et al. |
| 2,985,589 A | 5/1961 | Broughton et al. |
| 3,266,007 A | 8/1966 | Sullivan |
| 4,096,036 A | 6/1978 | Liu et al. |
| 4,182,633 A | 1/1980 | Ishikawa et al. |
| 4,256,840 A | 3/1981 | Meitzner et al. |
| 4,358,322 A * | 11/1982 | Neuzil .................... C13K 3/00 127/46.2 |
| 4,519,845 A | 5/1985 | Ou |
| 5,176,832 A | 1/1993 | Dorta et al. |
| 5,221,478 A | 6/1993 | Dhingra et al. |
| 5,244,926 A | 9/1993 | Harris et al. |
| 5,730,877 A | 3/1998 | Heikkila et al. |

FOREIGN PATENT DOCUMENTS

| | | |
|---|---|---|
| GB | 1548543 | 7/1979 |
| SU | 1507799 | 9/1989 |
| WO | 9308308 | 4/1993 |
| WO | 03056038 | 7/2003 |

* cited by examiner

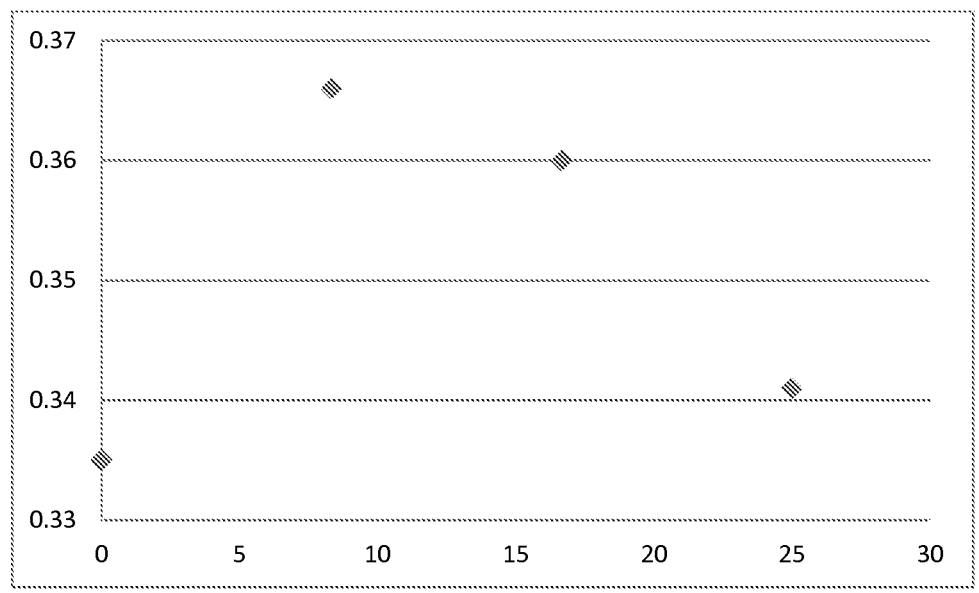

CHROMATOGRAPHIC SEPARATION OF SUGARS USING BLEND OF CATION EXCHANGE RESINS

FIELD

The invention relates chromatographic separation of sugars using ion exchange media.

INTRODUCTION

Ion exchanges resins are commonly used to chromatographically separate sugars within sugar-containing liquid feed mixtures. See for example U.S. Pat. No. 5,176,832, U.S. Pat. No. 5,221,478 and SU 1507799. One of the more commercially important separations involves separating fructose from fructose/glucose mixtures in order to increase fructose concentrations, e.g. from less than 50 wt % purity to over 90 wt %. Traditionally, gel-type, strong acid, cation exchange resins in their calcium form have been used in such separations.

SUMMARY

The invention includes a chromatographic method for separating a sugar from a sugar-containing liquid feed mixture by: contacting the liquid feed mixture with a stratum of cation exchange resins comprising a crosslinked copolymer matrix functionalized with sulfonic acid groups, and recovering a first product stream from the stratum that has a higher purity of the sugar than present in the liquid feed mixture. The method is characterized by the stratum of cation exchange resins including: i) at least 80 wt % of cation exchange resin including alkaline earth counter ions, and ii) at least 5 wt % of cation exchange resin including alkali metal counter ions. In a preferred embodiment, the liquid feed mixture includes multiple sugars that are separated into independent product streams that have a higher degree (e.g. at least a 10% improvement) of resolution of sugars than when compared with a stratum of cation exchange resins including either alkaline earth or alkali metal counter ions.

BRIEF DESCRIPTION OF THE DRAWINGS

FIG. 1 is a plot of data from the Examples showing sugar (glucose-fructose) resolution as a function of the wt % of sodium form cation exchange resin combined with calcium form cation exchange resin used in the present method.

DETAILED DESCRIPTION

The invention includes a chromatographic method for separating a first sugar from a sugar-containing liquid feed mixture including the steps of contacting the feed mixture with a stratum of cation exchange resins and recovering a first product stream that has a higher purity of the first sugar than the feed mixture. Additional product streams may also be recovered including relatively higher puritys of secondary components (e.g. different sugars). The secondary component may be selected from one or more of the following compounds: a second sugar component that is different from the first sugar component and non-sugar components such as inorganic salts, amino acids, alcohols, organic acids, and salts of organic acids. In preferred embodiments, the liquid feed mixture includes at least two sugar components. Sugars of particular interest include glucose, fructose, lactose, sucrose, maltose, glucose, galactose, sorbose, xylose, manose, isomaltose, stachyose, arabinose, tagatose, raffinose, and oligosaccharides. Of particular interest are liquid mixtures comprising fructose and glucose.

The non-sugar components are compounds which do not substantially interfere with separation of the sugar or sugars container in the liquid feed mixture.

Suitable inorganic salts are those which are soluble in the liquid mixture, and are preferably selected from alkali metal or alkaline earth metal halides. Examples of suitable inorganic salts are potassium chloride, sodium chloride, calcium chloride, magnesium chloride, potassium sulfate, and sodium carbonate.

Suitable amino acids are carbon-containing compounds which are soluble in the liquid mixture and have at least one amino group (—NH2) and one carboxyl group (COOH). Examples of suitable amino acids are glycine, alanine, glutamine, lysine, and phenylalanine. Preferred amino acids are those having a carbon atom content of 10 or less, and more preferably seven or less. Suitable alcohols may be mono- or polyhydric in nature, and preferably have 10 carbon atoms or less. Preferred alcohols have from one to about seven carbons. Examples of suitable alcohols are methanol, ethanol, n-propanol, iso-propanol, n-butanol, t-butanol, n-pentanol, n-hexanol, cyclohexanol, and n-octanol. Particularly preferred alcohols include polyols.

Suitable organic acids have at least one carboxyl group and have a carbon atom content of 10 or less. Preferred organic acids have from one to seven carbons. Examples of suitable organic acids are benzoic acid, citric acid, acetic acid, formic acid, propionic acid, butyric acid, and salts of such acids. Where the acid is in its salt form, the counterion is preferably an alkali or alkaline earth metal ion, such as sodium, potassium or calcium.

The cation exchange resins used in the present method are preferably provided in bead form. Applicable resins include a crosslinked copolymer matrix derived from polymerizing a monomer mixture including a monovinylidene monomer such as styrene and a crosslinker such as divinylbenzene, e.g. by suspension polymerization of a finely divided organic phase comprising styrene along with other optionally monovinylidene monomers, crosslinking monomers including divinylbenzene, a free-radical initiator and optionally a phase-separating diluent. While the crosslinked copolymer may be macroporous or gel-type, gel-type copolymers are preferred. The terms "gel-type" and "macroporous" are well-known in the art and generally describe the nature of the copolymer bead porosity. The term "macroporous" as commonly used in the art means that the copolymer has both macropores and mesopores. The terms "microporous," "gellular," "gel" and "gel-type" are synonyms that describe copolymer beads having pore sizes less than about 20 Angstroms Å, while macroporous copolymer beads have both mesopores of from about 20 Å to about 500 Å and macropores of greater than about 500 Å. Gel-type and macroporous copolymer beads, as well as their preparation are further described in U.S. Pat. No. 4,256,840 and U.S. Pat. No. 5,244,926—the entire contents of which are incorporated herein by reference. The crosslinked copolymer resin beads preferably have a median bead diameter from 100 to 1000 microns. The beads may have a Gaussian particle size distribution but preferably have a relatively uniform particle size distribution, i.e. "monodisperse" that is, at least 90 volume percent of the beads have a particle diameter from about 0.9 to about 1.1 times the volume average particle diameter.

The copolymer beads may be converted to sulfonated, cation-exchange resin using techniques well-known in the art. For example, sulfonated resin may be prepared from the crosslinked copolymer beads using methods described, for example, in U.S. Pat. Nos. 3,266,007; 2,500,149; 2,631,127; 2,664,801; and 2,764,564—the relevant teachings of which are incorporated herein by reference. In general, sulfonated cation-exchange resins are prepared by reacting the crosslinked copolymer beads with a sulfonation agent, such as concentrated sulfuric acid (acid which has at least about 95 weight percent sulfuric acid based upon total weight), oleum, chlorosulfonic acid, or sulfur trioxide, at a temperature and for a time sufficient to achieve a desired degree of sulfonation. A preferred sulfonation agent is concentrated sulfuric acid. The amount of concentrated sulfuric acid should be sufficient to provide adequate mixing during reaction, with a weight ratio of acid to beads of from about 6:1 to about 20:1 being generally sufficient. Typically, the acid and copolymer beads are maintained at a temperature of from about 0° C. to about 200° C. for a time sufficient to obtain resin having a dry weight capacity of at least about 0.5 milliequivalents per gram (meq/g). Resins in which only a specific region of the copolymer is functionalized may also be employed in this invention. Examples of such resins are those in which only the exterior portion, or shell, is functionalized, such as that described in European Patent Application EP-A-0 361 685.

After sulfonation, the resin may be hydrolyzed by washing with water and converted to an alkali or alkaline metal salt. The resin is preferably washed initially with a series of aqueous sulfuric acid solutions, each of which is successively more dilute in comparison to the sulfuric acid solution used in the preceding acid wash, and finally with water. Thereafter, the washed resin may be converted to a desired metal salt form by contact with a saturated aqueous solution of water-soluble metal salt or base having the desired metal counterion. For example, the resin can be converted to its calcium form by contact with a calcium chloride or calcium hydroxide solution. The resin may be converted to other forms in like manner using suitable water-soluble salts of the desired metal.

Methods for making applicable cation exchange resins are described in U.S. Pat. No. 5,176,832 and U.S. Pat. No. 5,221,478—both of which are incorporated herein in their entirety.

The stratum of cation exchange resins used in the present invention preferably includes 1) at least 75 wt % (and more preferably at least 80 wt %) of cation exchange resin comprising alkaline earth counter ions (preferably at least one but also combinations selected from calcium, strontium and barium), and ii) at least 5 wt % of cation exchange resin comprising alkali metal counter ions (preferably selected from at least one but also combinations of: lithium, sodium and potassium). In a more preferred embodiment, the stratum of cation exchange resins comprises: i) from 80 to 95 wt % of cation exchange resin comprising alkaline earth counter ions, and ii) from 5 to 20 wt % of cation exchange resin comprising alkali metal counter ions. The combination of cation exchange resins in both alkaline earth and alkali metal forms provides improved resolution between constituents within the liquid feed mixture—particularly sugars such as glucose and fructose. Applicable commercially available cation exchange resins include DOWEX MONOSHERE 99Ca310 along with its sodium converted counterpart resin. The alkaline earth and alkali metal form resins are preferably blended prior to forming the stratum and rinsed, after which time the counter-ions will reach an equilibrium distribution.

The sugar-containing liquid feed mixture to be treated is contacted with a stratum of the cation exchange resins under conditions such that passage of a first sugar component through the stratum proceeds at a rate which is different than the rate for the secondary components (e.g. second sugar component) of the liquid mixture. Advantageously, the stratum is a column or bed of the resin provided within a packed vessel, such as a chromatography column, with an amount of resin sufficient to result in separation of the desired components. After the liquid feed mixture is contacted with the stratum, it is eluted in known manner using a solvent for the components of the mixture. In this manner, the products eluted from the stratum comprise a first recoverable product stream which is rich in the first sugar component and at least one second recoverable product stream which is deficient in the first sugar component. Preferably, the process produces at least two recoverable product streams, each of which is relatively pure in a given sugar or non-sugar component relative to the other recoverable product streams. Processes for chromatographic separations using ion-exchange resins are known, and are described, for example, by Wankat, Large-Scale Adsorption and Chromatography, CRC Press, Inc., Boca Raton, Fla. (1986) and U.S. Pat. Nos. 5,176,832, 5,221,478, 4,182,633 and 2,985,589, the teachings of which are incorporated herein by reference.

The conditions of the separation depend to a large extent on the particular liquid mixture being separated. In general, the temperature at which the separation is conducted is limited by the freezing point, boiling point, and viscosity of the liquid mixture being separated, as well as the temperature at which the sugar components, non-sugar components, or the resin itself begins to decompose. Temperatures from 20° C. to 100° C. are generally preferred.

The concentration of all sugar and non-sugar components in the liquid mixture is advantageously in the range of from about 1 percent to about 95 weight percent based on total weight of the mixture. It is preferred to use as high a concentration of sugar and non-sugar components as possible to avoid removing large amounts of solvent from product streams. The feed concentration also depends somewhat on temperature, as highly concentrated sugar solutions tend to be highly viscous at lower temperatures. Where non-sugar components are present in the liquid mixture, it is preferred that they be present in an amount less than about 60 weight percent, and more preferably less than about 30 weight percent based on the weight of all sugar and non-sugar components in the mixture.

The liquid mixture flow rate may vary widely, and is partially dependent on the particular mixture being separated. A flow rate of about 0.1 to about 20, preferably about 0.25 to about 5, more preferably about 0.4 to about 2 bed volumes (the term "bed volume" refers to a volume of fluid equal to the volume of the resin bed) per hour can be used in most separations.

The volume of desorbing solvent, i.e., an eluant, used can vary widely, and is not particularly critical. In general, it is preferred to minimize the use of desorbing solvent so that smaller quantities of desorbing solvent must be removed from product streams. For example, in continuous processes, from about 0.1 to about 20, preferably about 1 to about 8, more preferably about 1 to about 4 times the volume of the feed mixture can be used. In batch or pulsed mode processes, up to about 50 bed volumes are advantageously used.

In the preferred fructose/glucose separation, an aqueous solution containing a mixture of fructose and glucose, such as that obtained from an isomerization process, is passed through the resin bed and eluted with water, so that there is obtained a product mixture containing a higher relative purity of fructose. The product mixture advantageously contains at least about 50 wt % fructose, preferably at least about 55 wt % fructose, more preferably about 55 to about 99 wt % fructose. The separation is preferably conducted at a temperature of about 20° C. to about 80° C., more preferably about 40° C. to about 70° C., most preferably about 50° C. to about 60° C., in order to minimize viscosity and microbial growth without substantially degrading the sugars. The concentration of sugar components within the feed is advantageously from about 30 to about 75, more preferably from about 45 to about 65, most preferably from about 50 to about 60 wt % of the liquid mixture. Flow rates are advantageously about 0.1 to about 20, preferably about 0.25 to about 2.5, and more preferably about 0.4 to about 1.5 bed volumes per hour. Eluant volumes are advantageously about 0.1 to about 20, preferably about 1 to about 8, more preferably about 2 to about 4 times the feed volume.

Although a straight elution process can be used, greater efficiency and better separations are obtained commercially with the use of recycling or countercurrent, simulated countercurrent or pseudo-moving bed (simulated moving bed) processes. Such processes are described, for example, in Wankat, supra, Food Processing, July 1979, pp. 74-75, Chemical Engineering, Jan. 24, 1983, pp. 50-52, and Bieser and de Rosset, "Continuous Countercurrent Separation of Saccharides with Inorganic Adsorbents", Die Staarke, Jahrg. 1977, No. 11, pp. 392-397, all incorporated herein by reference.

EXAMPLES

Several different blends of calcium and sodium forms DOWEX MONOSPHERE 99Ca310* were prepared and tested using a glass column having an inner diameter of 2.5 cm and a height of 1 m. The column was loaded with a stratum of resins having an approximately height of 95 cm. The liquid feed mixture used in each test comprised 15 Brix (15% solid content, fructose purity is 42% and glucose purity is 58%). Pulse (feed) volume was 10 ml, and elution was conducted using pure water at a flow rate of 20 ml/min at 60° C. After 10 ml pulse feed injection, eluant water was kept at 20 ml/min. Samples were fractioned and continuously collected. Glucose/fructose purity of the samples was measured through HPLC. The separation resolution was assessed by band width and peak position, as $$R = 2*(Vf-Vg)/(Wf+Wg)$$

where Vf and Vg are the elution time of the peak value of fructose and glucose respectively (Glucose was eluted faster than fructose in the column); Wf and Wg are the width of the fructose peak and glucose peak respectively. The width of the peak was the width of the segment of the peak base intercepted by the tangents drawn to the inflection points on either side of the peak (following the method of the International Union of Pure and Applied Chemistry IUPAC. Compendium of Chemical Terminology, 2nd ed. (the "Gold Book"), Compiled by A. D. McNaught and A. Wilkinson. Blackwell Scientific Publications, Oxford (1997)). Resolution values were calculated and plotted in FIG. 1. Blends comprising approximately 90 wt % Ca form and 10 wt % Na form of cation exchange resins provided the highest resolution, i.e. approximately 10% higher than the resolution of resin bed comprising solely the calcium form of resin.

*DOWEX MONOSPHERE 99Ca310 is a styrene-divinylbenzene crosslinked gel-type resin having an average particle size of 310 um, commercially available from The Dow Chemical Company. Calcium form resin was converted to sodium form by flowing 20 bed volumes of 1M NaCl through the resin.

The invention claimed is:

1. A chromatographic method for separating a first sugar from a sugar-containing liquid feed mixture by:
    contacting the liquid feed mixture with a stratum of cation exchange resins comprising a crosslinked copolymer matrix functionalized with sulfonic acid groups, and
    recovering a first product stream from the stratum that has a higher purity of the first sugar than present in the liquid feed mixture, wherein the method is characterized by the stratum of cation exchange resins comprising:
    i) at least 75 wt of cation exchange resin comprising alkaline earth counter ions, and
    ii) at least 5 wt % of cation exchange resin comprising alkali metal counter ions.

2. The method of claim 1 wherein the alkaline earth counter ions are selected from at least one of: calcium, strontium and barium.

3. The method of claim 1 wherein the alkali metal counter ions are selected from a least of: lithium, sodium and potassium.

4. The method of claim 1 wherein the crosslinked copolymer matrix is derived from a monomer mixture comprising styrene and divinylbenzene.

5. The method of claim 1 wherein the cation exchange resins are provided in bead form having a particle size of from 100 to 1000 um.

6. The method of claim 1 wherein the stratum of cation exchange resins comprises:
    i) from 80 to 95 wt % of cation exchange resin comprising alkaline earth counter ions, and
    ii) from 5 to 20 wt % of cation exchange resin comprising alkali metal counter ions.

7. The method of claim 1 wherein the sugar-containing liquid feed mixture includes at a least two different types of sugar and wherein the first sugar is recovered in the first product stream, and the method further includes the step of recovering a second product stream wherein:
    i) the first product stream has a higher purity of the first sugar than the second product stream, and
    ii) the second product stream has a higher purity of the second sugar than the first product stream.

8. The method of claim 7 wherein the first and second sugars are selected from: glucose, fructose, lactose, sucrose, lactose, sucrose, maltose, glucose, galactose, sorbose, xylose, mannose, isomaltose, stachyose, arabinose, tagatose, and raffinose.

* * * * *